(12) United States Patent
Nishikawa

(10) Patent No.: US 6,804,792 B2
(45) Date of Patent: Oct. 12, 2004

(54) COMPUTER POWER MANAGEMENT WITH CONVERTER FOR CHANGING GENERATED POWER MODE COMMANDS FOR EXTERNAL DEVICES

(75) Inventor: Hirofumi Nishikawa, Hamura (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 631 days.

(21) Appl. No.: 09/779,554

(22) Filed: Feb. 9, 2001

(65) Prior Publication Data

US 2001/0014950 A1 Aug. 16, 2001

(30) Foreign Application Priority Data

Feb. 10, 2000 (JP) ........................................ 2000-034081

(51) Int. Cl.[7] ................................................ G06F 1/32
(52) U.S. Cl. ...................... 713/323; 713/300; 713/310; 713/320; 713/324; 713/330; 713/340
(58) Field of Search ............................... 713/323, 300, 713/310, 320, 324, 330, 340

(56) References Cited

U.S. PATENT DOCUMENTS

| | | | | |
|---|---|---|---|---|
| 5,389,952 A | | 2/1995 | Kikinis | 345/212 |
| 5,448,262 A | * | 9/1995 | Lee et al. | 345/212 |
| 5,465,366 A | * | 11/1995 | Heineman | 713/324 |
| 5,493,684 A | * | 2/1996 | Gephardt et al. | 713/322 |
| 5,638,541 A | * | 6/1997 | Sadashivaiah | 713/323 |
| 5,648,799 A | | 7/1997 | Kikinis | 345/212 |
| 5,821,924 A | | 10/1998 | Kikinis et al. | 345/212 |
| 5,832,280 A | * | 11/1998 | Swanberg | 713/300 |
| 5,880,719 A | | 3/1999 | Kikinis | 345/212 |
| 5,905,900 A | * | 5/1999 | Combs et al. | 713/320 |
| 5,919,263 A | | 7/1999 | Kikinis et al. | 713/320 |
| 6,005,559 A | * | 12/1999 | Miyamoto | 345/212 |

OTHER PUBLICATIONS

Tanenbaum, Andrew S., "Structured Computer Organization", 1984, Prentice Hall, 2nd Edition, p. 11.*
McLaughlin, J., et al., "Display Power Management Signaling (DPM S) Proposal" (1993), pp. 1–8.

* cited by examiner

*Primary Examiner*—Lynne H. Browne
*Assistant Examiner*—Tse Chen
(74) *Attorney, Agent, or Firm*—Finnegan, Henderson, Farabow, Garrett & Dunner, L.L.P.

(57) ABSTRACT

A computer is connected to an external device and outputs a command to the external device to shift the external device to a power saving state. The computer comprises an operating system generating a first power saving command for shifting the external device to a first power saving state when a non-operation time reaches a first time, a driver converting the first power saving command into a second power saving command for shifting the external device to a second power saving state in which power consumption is lower than the first power saving state. The converted second power saving command is output to the external device.

15 Claims, 4 Drawing Sheets

COMPUTER POWER MANAGEMENT WITH CONVERTER FOR CHANGING GENERATED POWER MODE COMMANDS FOR EXTERNAL DEVICES

CROSS-REFERENCE TO RELATED APPLICATIONS

This application is based upon and claims the benefit of priority from the prior Japanese Patent Application No. 2000-034081, filed Feb. 10, 2000, the entire contents of which are incorporated herein by reference.

BACKGROUND OF THE INVENTION

The present invention relates to a power saving control function for a computer such as a personal computer.

Various portable notebook type personal computers capable of operating by batteries have recently been developed. A computer of this type has various power saving functions in order to prolong the continuous operation time of the system by a battery as long as possible. One of them is a power saving function concerning a display device such as an LCD or CRT.

Standards for the power saving function include the International Energy Star standard which defines that a computer must comprise a function capable of activating the low-power mode and deep sleep mode of a display. The low-power mode is the first low-power state which is automatically activated after the computer does not operate for the first predetermined time. The deep sleep mode is the second low-power state which is automatically activated when the computer does not operate for the second predetermined time. According to this standard, the shift time for activating the low-power mode must be set within 30 min, and the shift time must be set to activate the deep sleep mode within 70 min. Further, the total of the shift times to the low-power mode and deep sleep mode must fall within 70 min. Note that the shift time is changeable by the user.

For example, if the computer does not operate for a predetermined time or more set by the user, an operating system (to be simply referred to as an OS hereinafter) generates the first operation mode signal for shifting to a standby state (corresponding to the low-power mode) in which the screen display is turned off. Further, if the computer does not operate for another predetermined time or more set by the user, the OS outputs the second operation mode signal for shifting to a power-off state (corresponding to the deep sleep mode). The BIOS receives these mode signals, and controls the display controller to control the operation state of the display.

In this manner, if a non-operation state continues for a certain time or more, power consumption is temporarily reduced, and then the display is turned off. In other words, a plurality of stages (two stages in this example) of the power saving state are set. If a mouse or keyboard is operated in either the standby state or power-off state, display resumes. In a CRT, the time until display resumes is shorter in return from the standby state than in return from the power-off state. For this reason, when the computer with the CRT does not operate for a predetermined time, it is not immediately set to the power-off state but temporarily to the standby state.

Some other OSs further divide the standby state into a plurality of states, and gradually reduce power consumption through a plurality of states.

In general, a so-called server OS having an advanced network-compatible function does not take multistage power saving control, and directly shifts to the power-off state after the non-operation state continues for a predetermined time, i.e., takes only two, power-on and power-off states.

Most of the OSs of conventional computer systems first output a standby mode signal when a computer does not operate for a predetermined time, and then output a deep sleep mode signal to set the power-off state when the computer does not operate for another predetermined time.

However, some users attach importance to the power saving effect more than the time-shortening effect until display resumes, do not require the multistage power saving state, do not desire to set the power-off state after the standby state is temporarily set, but desire to directly set the power-off state. When an LCD is used in place of a CRT, the time until display resumes is almost the same between return from the power-off state and return from the standby state.

In this manner, most of conventional OSs cannot cope with a demand for directly setting the power-off state when the computer does not operate for a predetermined time, in order to enhance the power saving effect.

Along with upgrading (function advance) of an OS, the upgraded version of the above-mentioned OS (if the non-operation state continues for a predetermined time, the OS first outputs a low-power mode signal, and if the non-operation state further continues, outputs a deep sleep mode signal) can be used as a server OS. When the server OS, which immediately shifts to the power-off state in non-operation, is upgraded, the display device of a client is not immediately set to the power-off state but is temporarily set to the standby state. A client user who does not know the change of the OS or forgets it may mistake this state for a malfunction of the computer, and may be confused. Even a user who knows the change of the OS may feel unnatural if display operation changes.

BRIEF SUMMARY OF THE INVENTION

Accordingly, it is an object of the present invention to provide a computer and power saving control method capable of realizing power saving control in a smaller number of stages or simple power saving control in only two ON and OFF states, and enhancing the power saving effect with a simple arrangement without changing the OS even if the OS defines power saving control in a plurality of stages.

It is another object of the present invention to provide a computer and power saving control method capable of performing power saving control similar to a previous OS without causing confusion or unnatural feeling of the user even if the OS is changed to change computer operation concerning power saving control.

According to the present invention, there is provided a computer which is capable of being connected to an external device and outputting a command to the external device to shift the external device to a power saving state, the computer comprising a generator configured to generate a first power saving command for shifting the external device to a first power saving state when a non-operation time reaches a first time, a converter configured to convert the first power saving command into a second power saving command for shifting the external device to a second power saving state in which power consumption is lower than the first power saving state, and an output unit configured to output the second power saving command to the external device.

According to the present invention, there is provided a power saving method for a computer which is capable of being connected to an external device and outputting a command to the external device to shift the external device to a power saving state, the method comprising detecting a non-operation time; generating a first power saving command for shifting the external device to a first power saving state when the non-operation time reaches a first time; and converting the first power saving command into a second power saving command for shifting the external device to a second power saving state in which power consumption is lower than the first power saving state; and outputting the second power saving command to the external device.

According to the present invention, there is provided a computer program for a computer which is capable of being connected to an external device and outputting a command to the external device to shift the external device to a power saving state, the program being stored in a computer readable medium, and the program comprising the following steps of generating a first power saving command for shifting the external device to a first power saving state when a non-operation time reaches a first time; converting the first power saving command into a second power saving command for shifting the external device to a second power saving state in which power consumption is lower than the first power saving state; and outputting the second power saving command to the external device.

According to the present invention, there is provided another computer in which an operating system sequentially outputs a plurality of power saving commands to a hardware to reduce power consumption stepwise, the computer comprising a download unit located between the operating system and the hardware and configured to download a software for receiving the plurality of power saving commands, converting the plurality of power saving commands into a smaller number of power saving commands, and outputting the smaller number of power saving commands, and wherein the plurality of power saving commands output by the operating system are supplied to the hardware as the smaller number of power saving commands via the software, and power consumption is reduced based on the smaller number of power saving commands in a smaller number of stages than stages defined by the operating system.

According to the present invention, there is provided a still further power saving setting method comprising downloading an operating system; downloading a software for, if the operating system is able to generate a plurality of power saving commands and generates a predetermined power saving command, for changing the predetermined power saving command into a power saving command other than the predetermined power saving commands; and performing a power saving control for a peripheral device in accordance with the power saving command output from the operating system or the software.

According to the present invention, there is provided a still further computer comprising a download unit configured to download an operating system; a download unit configured to, if the operating system is able to generate a plurality of power saving commands and generates a predetermined power saving command, download a software for changing the predetermined power saving command into a power saving command other than the predetermined power saving commands; and a power saving controller configured to perform a power saving control for a peripheral device in accordance with the power saving command output from the operating system or the software.

According to the present invention, there is provided a still further method of manufacturing a computer, comprising manufacturing a computer for an order not including an operating system;

manufacturing a software used in the computer to, if the operating system is able to generate a plurality of power saving commands and generates a predetermined power saving command, change the predetermined power saving command into a power saving command other than the predetermined power saving commands; and packaging the computer and the software.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of a computer according to the present invention will now be described with reference to the accompanying drawings.

Figure 1:
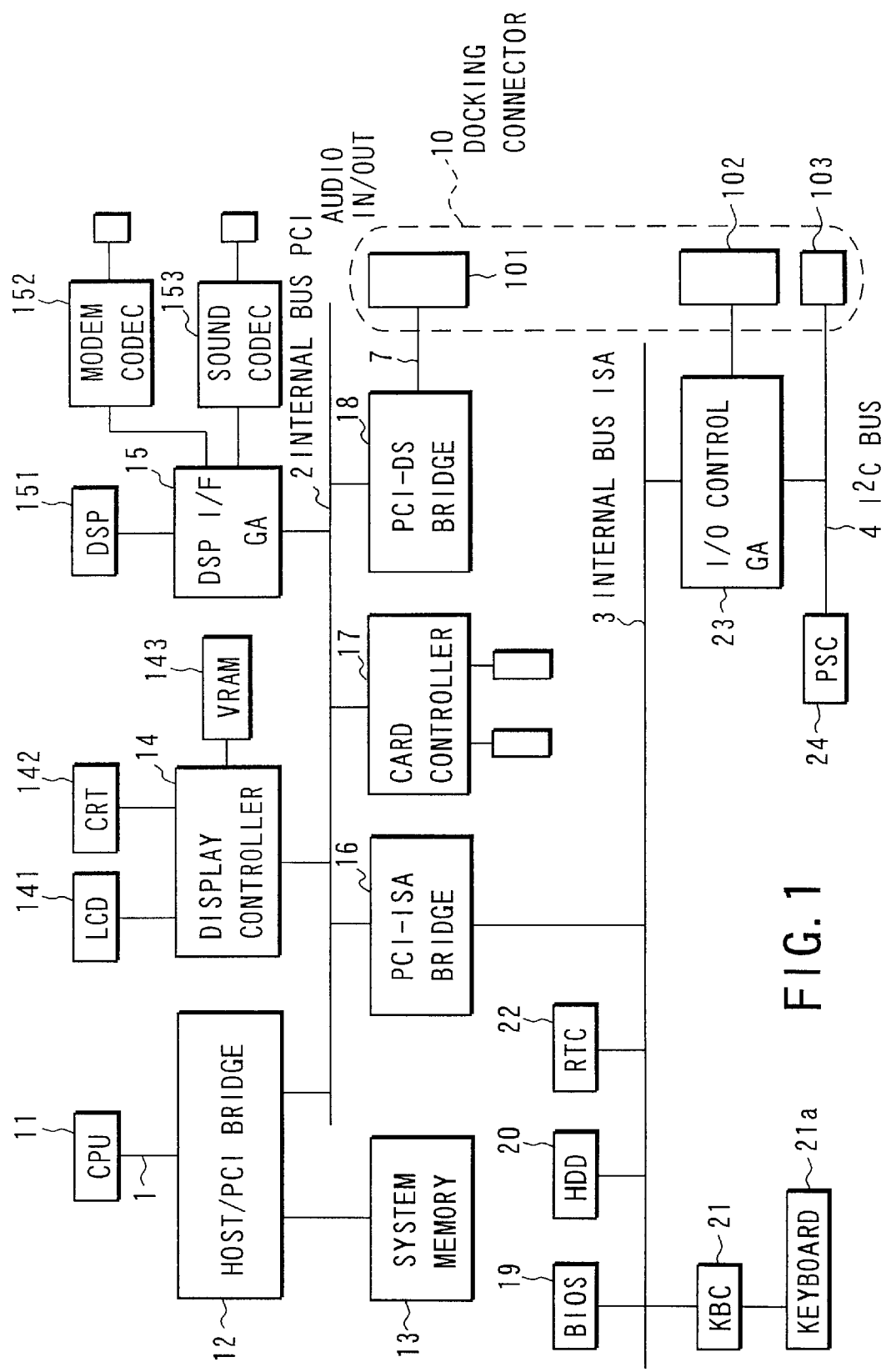
FIG. 1 is a block diagram showing the arrangement of a computer according to the first embodiment of the present invention.

FIG. 1 is a block diagram showing the hardware arrangement of a computer according to the first embodiment of the present invention.

The first embodiment will exemplify a battery-drivable notebook or laptop type portable computer, but the present invention can also be applied to a desktop type computer. The display device is not limited to a liquid crystal display device integrated with the main body, but may be a separate liquid crystal display device or CRT display device.

A processor bus 1, internal PCI bus 2, internal ISA bus 3, and I²C bus 4 are formed on the system board of the portable computer. If necessary, the user connects a docking station serving as an expansion unit for expanding a function to a docking connector 10 attached to the computer main body. The docking connector 10 has three connector elements 101, 102, and 103.

The computer main body incorporates a CPU 11, host/PCI bridge 12, system memory 13, display controller 14, DSP interface gate array (DSP I/F GA) 15, internal PCI/ISA bridge 16, card controller 17, PCI/DS (DS: Docking Station) bridge 18, BIOS memory (ROM) 19, hard disk drive (HDD) 20, keyboard controller 21, real-time clock (RTC) 22, I/O control gate array 23, and power supply controller (PSC) 24.

The functions and arrangements of the components in the computer main body in FIG. 1 will be explained.

The CPU 11 executes and controls various application programs including an OS and utility programs stored in the system memory 13. The processor bus 1 directly coupled to the I/O pin of the CPU 11 has a data bus with a predetermined bit width.

The system memory 13 is a memory device which stores the OS, device drivers, application programs to be executed, and processing data, and is formed of a plurality of DRAM modules. The system memory 13 is connected to the host/PCI bridge 12 via a dedicated memory bus having a data bus with a predetermined width. The data bus of the memory bus can be the data bus of the processor bus 1. In this case, the memory bus is formed of an address bus and various memory control signal lines.

The host/PCI bridge 12 is a bridge LSI connecting the processor bus 1 and internal PCI bus 2, and functions as one of bus masters of the internal PCI bus 2. The host/PCI bridge 12 has a function of bidirectionally converting a bus cycle including data and an address between the processor bus 1 and the internal PCI bus 2, and a function of access-controlling the memory 13 via the memory bus.

The internal PCI bus 2 is a clocked I/O bus. All cycles on the internal PCI bus 2 are synchronized with PCI bus clocks. The PCI bus 2 has an address/data bus used by time division.

The data transfer cycle on the PCI bus 2 is formed of an address phase and one or more subsequent data phases. An address and transfer type are output in the address phase, and, for example, 8-, 16-, 24-, or 32-bit data is output in the data phase.

The display controller 14 is one of bus masters of the internal PCI bus 2, similar to the host/PCI bridge 12, and displays image data of a video memory (VRAM) 143 on a display device such as an LCD 141 or CRT 142. The display device may be integrated with the main body, or separated. The computer system of the first embodiment has a function of stopping a display timing control signal, supplied to the LCD 141 or CRT 142, in accordance with a request.

More specifically, when a time during which no operation (pointing with a mouse or key input) is done reaches the first time set by the user, the OS outputs the first control signal (power saving request) for shifting the display device to a standby state. When the non-operation time reaches the second time longer than the first time, the OS outputs the second control signal for shifting the display device to a suspend state. Further, when the non-operation time reaches the third time longer than the second time, the OS outputs the third control signal for shifting the display device to a power-off state. In this case, the display is stopped in both the standby and suspend states, but power consumption is lower in the suspend state. For example, the display can be stopped by stopping generation of either of vertical and horizontal sync signals VSYNC and HSYNC. In the power-off state, the two signals are stopped. In the standby state, generation of VSYNC is stopped. In the suspend state, generation of HSYNC is stopped to realize lower power consumption than in the standby state. Note that definition of the standby, suspend, and power-off states is not limited to this, and may be realized by stopping another signal.

The BIOS receives the first, second, and third signals from the OS, and transfers them to the display controller 14.

The DSP interface gate array 15 is one of PCI devices, and constitutes a DSP system for performing various sound processes and telephone/data communication processes together with a DSP 151, modem CODEC 152, and sound CODEC 153.

The DSP interface gate array 15 communicates with the DSP 151, modem CODEC 152, and sound CODEC 153 to control sound processing and communication processing using the digital signal processing function of the DSP 151 under the control of a dedicated device driver program executed after being loaded to the system memory 13.

The internal PCI/ISA bridge 16 is a bridge LSI connecting the internal PCI bus 2 and internal ISA bus 3, and functions as one of PCI devices. The internal PCI/ISA bridge 16 incorporates a PCI bus arbiter, DMA controller, and the like. The internal ISA bus 3 is connected to the BIOS memory 19, HDD 20, keyboard controller 21, RTC 22, and I/O control gate array 23.

The card controller 17 is one of PCI devices, and controls a PCMCIA or a PC card having card bus specifications.

The PCI/DS bridge 18 controls connection/disconnection of a bus with the docking station. That is, the PCI/DS bridge 18 is a bridge LSI connecting the internal PCI bus 2 and a docking bus 7 corresponding to a PCI bus, and functions as one of PCI devices. The docking bus 7 is externally led via the connector element 101 of the docking connector 10, and connected to the docking station.

The BIOS memory 19 stores a BIOS, and is formed of a flash memory so as to be programmable. In this embodiment, when the BIOS receives a display device power saving request from the OS, the BIOS executes power saving control so as to request the display controller 14 to stop a display timing control signal.

The real-time clock (RTC) 22 is a timepiece module having its own operation battery, and has a memory which always receives power from the battery. This memory is used to save, e.g., environment setting information representing a system operation environment.

The I/O control gate array 23 is a bridge LSI connecting the internal ISA bus 3 and I$^2$C bus 4, and incorporates a plurality of registers readable/writable by the CPU 11. Using these registers allows communicating the CPU 11 with the power supply controller 24 on the I$^2$C bus 4.

A plurality of control signal lines connected to the docking station are externally led from the I/O control gate array 23 via the connector element 102 of the docking connector 10. The I/O control gate array 23 detects docking/undocking between the computer main body and a docking station. Further, when the docking station is docked while the computer is powered, the I/O control gate array 23 controls to prevent destruction of the expansion unit in the docking station or malfunction of the system due to insertion/removal of a hot line.

The I$^2$C bus 4 is a bidirectional bus made of one clock signal line and one data line (SDA), and is externally led via the connector element 103 of the docking connector 10.

The power supply controller 24 turns on/off the computer in accordance with ON/OFF operation of the power supply switch or ON/OFF operation of an eject switch (described below). In addition, the power supply controller 24 controls the power supply in accordance with docking/undocking of the docking station.

Figure 2:
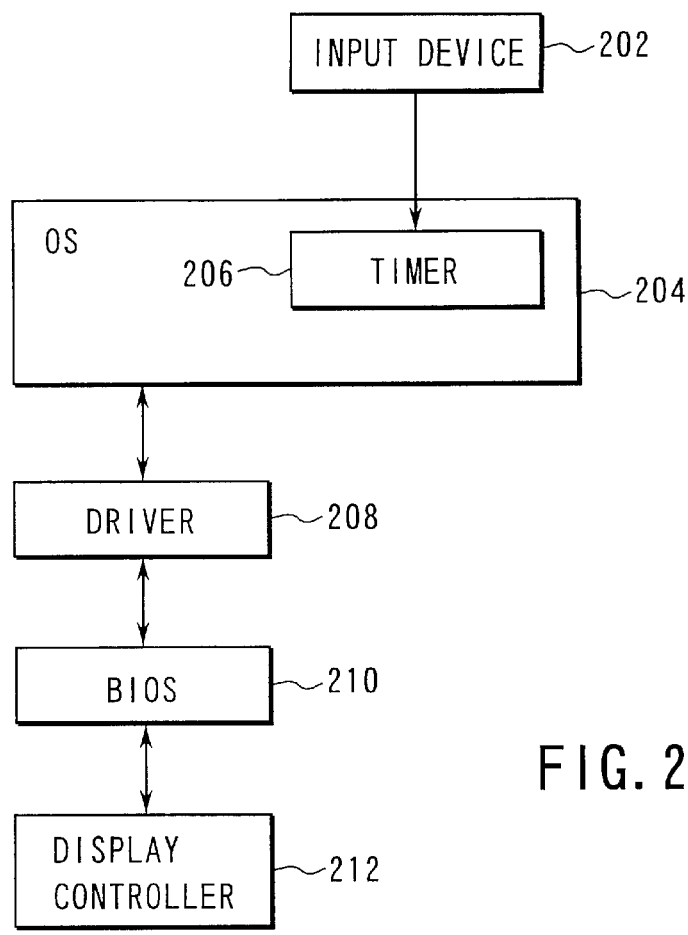
FIG. 2 is a block diagram showing the hierarchical structure of the system of the computer according to the first embodiment.

FIG. 2 shows the hierarchical structure of the computer system. An OS 204 comprises a timer 206 connected to an input device 202 such as a keyboard or mouse, and detects the non-operation time of the input device 202. If the non-operation time detected by the timer 206 reaches the first time, the OS 204 outputs the first control signal for shifting the display device to the standby state. If the non-operation time reaches the second time longer than the first time, the OS 204 outputs the second control signal for shifting the display device to the suspend state. Then, when the non-operation time reaches the third time longer than the second time, the OS 204 outputs the third control signal for shifting the display device to the power-off state. Before detecting the non-operation time of the input device 202, the OS 204 outputs a control signal for setting the power-on state.

Figure 3:
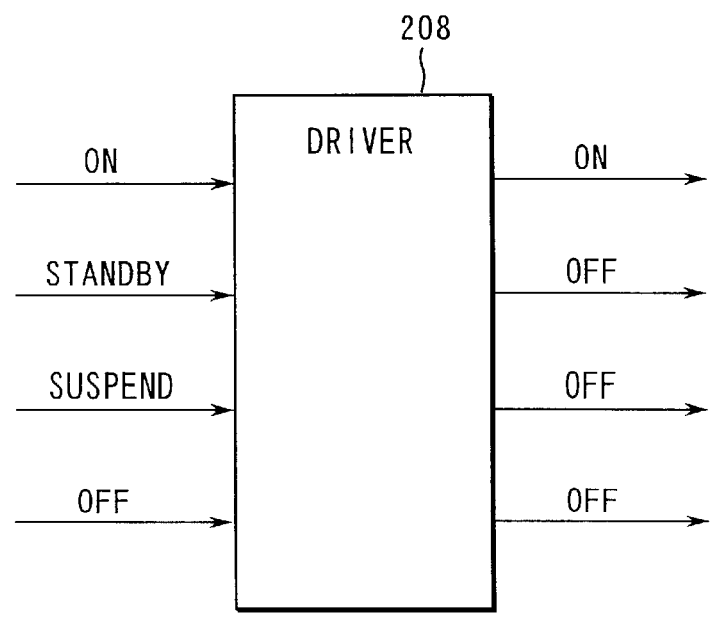
FIG. 3 is a view showing the operation of a driver according to the first embodiment.

In the present embodiment, a driver 208 is arranged between the OS 204 and a BIOS 210. The driver 208 appropriately converts a control signal output from the OS 204 into one as shown in FIG. 3, and outputs the converted signal in order to change the power saving control mode of the OS 204. That is, the driver 208 directly outputs ON and OFF signals for shifting to the power-on and power-off states, while converting standby and suspend signals for shifting to the standby and suspend states into OFF signals, and then outputting the OFF signals. In this manner, the driver 208 converts control signals (standby, suspend, and power-off signals) for setting a plurality of power saving states generated by the OS 204 into a control signal (in this case, an OFF signal) for setting a single power saving state. The driver 208 is not originally installed in the computer, but is downloaded via a network or read from a floppy drive (FD) or CD-ROM driver (neither is shown), and stored in the HDD 20 in accordance with a user's demand. The demand is to change the power saving control mode defined by the OS 204.

A control signal output from the driver 208 is input to the BIOS 210, and transferred to a display controller 212, similar to a control signal output from a conventional OS.

Figure 4:
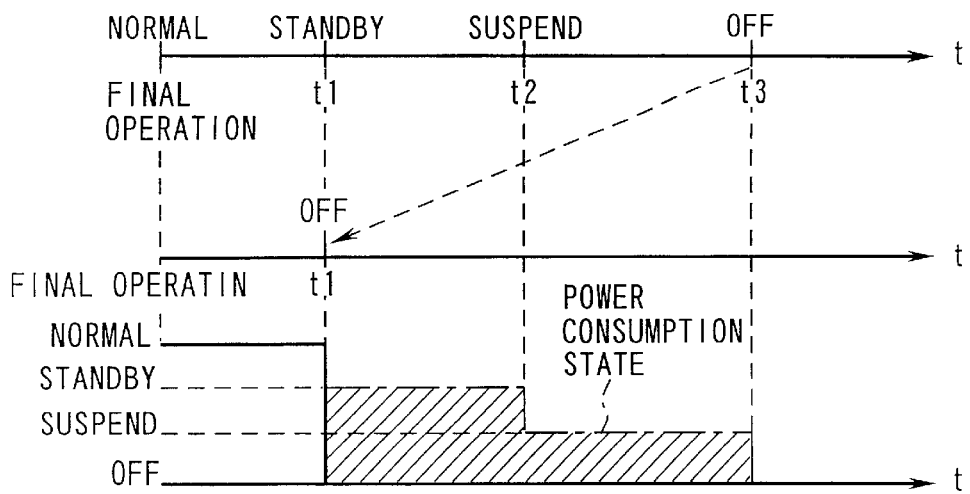
FIG. 4 is a timing chart for explaining a power saving control according to the first embodiment.

An example of power saving control according to the first embodiment will be explained. FIG. 4 shows the difference in operation between the prior art not including the driver 208 and the present invention including the driver 208.

The OS of this embodiment allows the user to set the shift time to the power saving state. Thus, the user sets a standby time t1, suspend time t2, and power-off time t3 until the display device shifts from the non-operation state to the standby state, suspend state, and power-off state. As will be described below, setting of the suspend time t2 and power-off time t3 is insignificant, but the user must set them because the OS 204 requests setting. When the input device 202 does not operate, the timer 206 starts measuring the non-operation time. When the measured time reaches the standby time t1, suspend time t2, or power-off time t3, the OS 204 outputs a standby, suspend, or power-off signal to the BIOS 210.

In the prior art, these signals are directly supplied from the BIOS 210 to the display controller 212. As a result, if the non-operation state of the input device 202 continues, the power consumption state of the display device sequentially changes from a normal state to the standby state, suspend state, and finally power-off state, and the power consumption amount gradually decreases.

To the contrary, in the first embodiment, as shown in FIG. 3, all the standby, suspend, and power-off signals output from the OS 204 are converted by the driver 208 into power-off signals, which are then supplied to the BIOS 210. When the non-operation state of the input device 202 reaches the standby time t1, the power consumption state of the display device changes from the normal state to the power-off state, as represented by the solid line in FIG. 4. This can reduce power consumption by an amount represented by hatched lines in comparison with the prior art.

Note that when the OS 204 detects the operation of the input device 202 after the standby time t1 (power-off state), it requests display device power saving cancel, i.e., outputs an ON signal. This ON signal is supplied to the display controller 212 as it is via the driver 208 and BIOS 210. Then, the display device resumes display.

According to the first embodiment, a multistage power saving control defined by the OS can be easily changed to a simple control using only two states ON and OFF by only installing the driver 208 on the user side without changing an OS or BIOS. This can meet a user's demand for further reducing power consumption instead of further shortening the time from the power-off state to the normal state (display resume). Saving power consumption is very important in a portable notebook type personal computer, and even in the use of an AC power supply, is also important in terms of protection of the global environment.

Other embodiments of the computer according to the present invention will be described. The same portions as those of the first embodiment will be indicated in the same reference numerals and their detailed description will be omitted. The above-described OS gradually reduces power consumption from the display state through the standby and suspend states. An embodiment concerning an OS which takes another reduction form will be explained.

Figure 5:
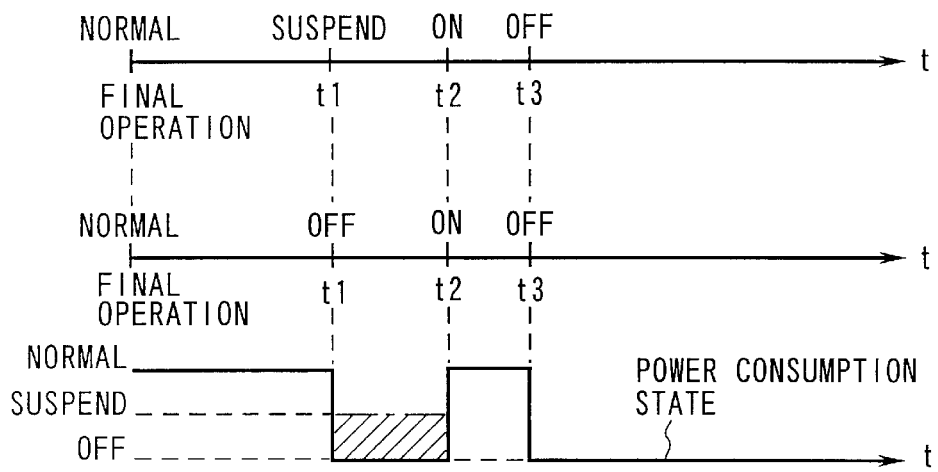
FIG. 5 is a timing chart for explaining a power saving control according to the second embodiment.

When the input device does not operate, and the non-operation time reaches the first setting time t1, second time t2, or third time t3, an OS of the second embodiment outputs a suspend, power-on, or power-off signal to an BIOS, as shown in FIG. 5. Note that the second and third times t2 and t3 cannot be set by the user, and their interval (t3−t2) is very short. Before the power supply is turned off, it is temporarily turned on in consideration of the serving life of a display device. A driver in this case is the same as the driver of the first embodiment shown in FIG. 3 except that input of a standby signal (and output of a corresponding power-off signal) is omitted, and thus is not illustrated.

Without a driver, if the non-operation state of the input device continues for the first time t1 set by the user, the display device shifts to the suspend state. Upon the lapse of a predetermined time, the display device is turned on instantaneously and then off. In the second embodiment, however, a suspend signal output from the OS is converted by the driver into a power-off signal, which is then supplied to the BIOS. If the non-operation time of the input device reaches the suspend time t1, the display device is turned off. Upon the lapse of a predetermined time, the display device is similarly turned on instantaneously and then off. For this reason, the second embodiment can save power which was consumed in the suspend state from the suspend time t1 to the power-on time t2 in the prior art.

Figure 6:
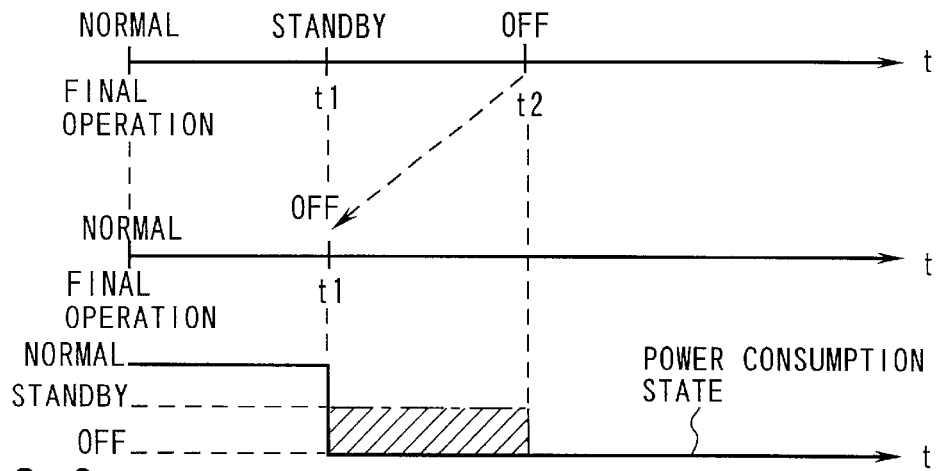
FIG. 6 is a timing chart for explaining a power saving control according to the third embodiment.

FIG. 6 shows another embodiment. When the input device does not operate, and the non-operation time reaches the first setting time t1, or second setting time t2, an OS of the third embodiment outputs a suspend or power-off signal to an BIOS, as shown in FIG. 6. A driver in this case is the same as the driver of the first embodiment shown in FIG. 3 except that input of a suspend signal (and output of a corresponding power-off signal) is omitted, and thus is not illustrated. Without a driver, if the non-operation state of the input device continues for the first time t1 set by the user, the display device shifts to the standby state. Upon the lapse of the second time t2, the display device is turned off. In the third embodiment, however, a standby signal output from the OS is converted by the driver into a power-off signal, which is then supplied to the BIOS. If the non-operation time of the input device reaches the standby time t1, the power consumption state of the display device shifts to the power-off state. The third embodiment can save power in the standby state which was consumed between the power-off time t2 and the standby time t1 in the prior art.

Figure 7:
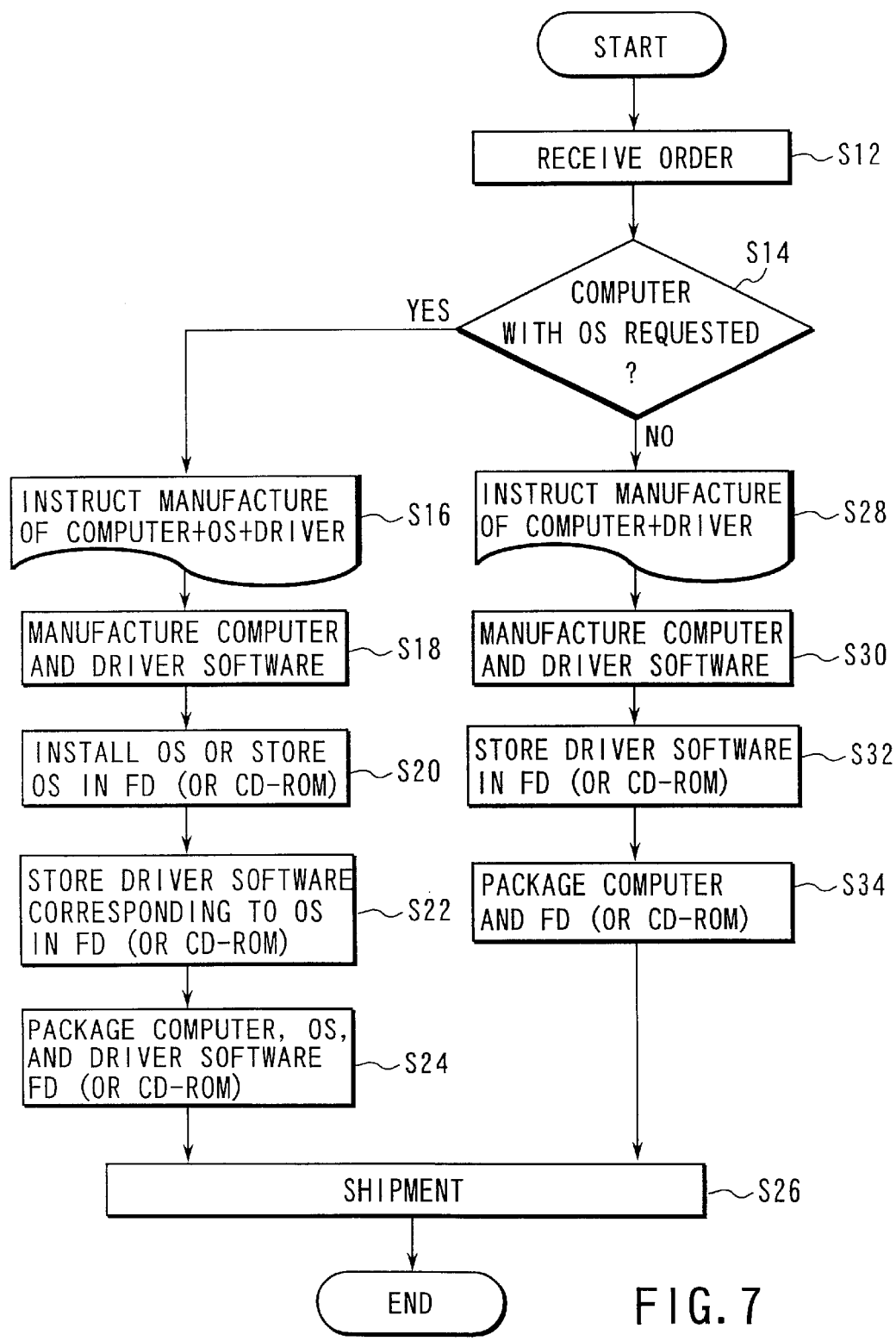
FIG. 7 is a flow chart showing the operation of a computer manufacturing system by a computer according to the fourth embodiment of the present invention.

A computer manufacturing system by a computer for manufacturing a computer including the above-mentioned driver will be explained as the fourth embodiment. FIG. 7 is a flow chart showing the manufacturing flow.

If the manufacturing system receives a user's order in step S12, the system determines in step S14 whether the contents of the order represent attachment of an OS. This is because the user may desire to separately purchase an OS or may have already had one. If YES in step S14, the system instructs in step S16 the manufacturing department to manufacture an OS, driver software corresponding to the OS (e.g., one of the first, second, and third embodiments), and computer. In step S18, the computer and driver software corresponding to the OS are manufactured. In step S20, the OS is installed in the manufactured computer or stored in an FD (or CD-ROM). In step S22, the driver software corresponding to the OS is stored in an FD (or CD-ROM). The computer, OS, and driver software FD (or CD-ROM) are packaged together in step S24, and shipped in step S26.

If NO in step S14, the system instructs in step S28 the manufacturing department to manufacture driver software (in this case, an OS is unknown, so that general-purpose driver software which can be applied to all currently available OSs, i.e., operates as all the first, second, and third embodiments is preferable) and computer. In step S30, the computer and driver software are manufactured. In step S32, the driver software is stored in an FD (or CD-ROM). The computer and driver software FD (or CD-ROM) are packaged together in step S34, and shipped in step S26.

The fourth embodiment changes the type of driver to be packaged depending on whether a purchase request includes attachment of an OS, and thus can eliminate wasteful packaging of driver software compatible to all computers.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the device subjected to power saving control is a display device. However, the present invention is not limited to this, and can also be applied to a storage device such as a hard disk drive or DVD.

The power saving signal output by the driver upon conversion is not limited to a control signal for setting the minimum power saving state, and may be a control signal for setting a desired power saving state. This is effective particularly in preventing confusion or unnatural feeling after computer operation changes along with change (update) of the OS, like a recent network server. In this case, the driver suffices to realize the same state as the state of a control signal output from a previous OS, and the power saving state need not be limited to the minimum one.

In the above description, the driver is inserted between the OS and the BIOS, power saving signals in a plurality of stages output from the OS are substantially converted into power saving signals in a smaller number of stages, and the converted signals are supplied to the BIOS. When the user can rewrite the BIOS, like a computer manufacturer, the BIOS may comprise the conversion function instead of using the driver.

The present invention provides a computer and power saving control method capable of realizing power saving control in a smaller number of stages or simple power saving control in only two ON and OFF states, and enhancing the power saving effect with a simple arrangement without changing the OS even if the OS defines power saving control in a plurality of stages. The present invention provides a computer and power saving control method capable of performing power saving control similar to a previous OS without causing confusion or unnatural feeling of the user even if the OS is changed to change computer operation concerning power saving control.

What is claimed is:

1. A computer which is capable of being connected to an external device and outputting a power saving command to the external device to shift the external device to a power saving state, the computer comprising:

a generator configured the generate a first power saving command for shifting the external device to a first power saving state when a non-operation time reaches a first time;

a converter configured the convert the first power saving command generated by the generator into a second power saving command for shifting the external device to a second power saving state in which power consumption is lower than the first power saving state; and an output unit configure to output the second power saving command to the external device instead of the first power saving command.

2. The computer according to claim 1, wherein when a non-operation time reaches a second time longer than the first time, said generator generates the second power saving command for shifting the external device from the first power saving state to the second power saving state, and said converter outputs the second power saving command when the second power saving command is input.

3. The computer according to claim 1, wherein when a non-operation time reaches a second time longer than the first time, said generator generates the second power saving command for shifting the external device from the first power saving state to the second power saving state, and said converter converts one of the first and second power saving commands into the other one of the first and second power saving commands, and outputs the converted command.

4. The computer according to claim 1, wherein said generator is included in an operating system.

5. The computer according to claim 1, further comprising an input device, and wherein said generator comprises a detector configured to detect a non-operation time of said input device.

6. The computer according to claim 1, wherein the external device comprises a display device.

7. A power saving method for a computer which is capable of being connected to an external device and outputting a power saving command to the external device to shift the external device to a power saving state, the method comprising:

detecting a non-operation time;

generating a first power saving command for shifting the external device to a first power saving state when the non-operation time reaches a first time;

converting the first power saving command into a second power saving command for shifting the external device to a second power saving state in which power consumption is lower than the first power saving state; and outputting the second power saving command to the external device instead of the first power saving command.

8. The method according to claim 7, further comprising:

generating the second power saving command for shifting the external device from the first power saving state to the second power saving state, when a non-operation time reaches a second time longer than the first time; and outputting the second power saving command when the second power saving command is input.

9. The method according to claim 7, further comprising:

generating the second power saving command for shifting the external device from the first power saving state to the second power saving state, when a non-operation time reaches a second time longer than the first time; and converting one of the first and second power saving commands into the other one of the first and second power saving commands.

10. A computer program for a computer which is capable of being connected to an external device and outputting a power saving command to the external device to shift the external device to a power saving state, the program being stored in a computer readable medium, and the program comprising the following steps of:

generating a first power saving command for shifting the external device to a first power saving state when a non-operation time reaches a first time;

converting the first power saving command into a second power saving command for shifting the external device to a second power saving state in which power consumption is lower than the first power saving state; and outputting the second power saving command to the external device instead of the first power saving command.

11. A computer which is capable of being connected to an external device and outputting a power saving command to the external device to shift the external device to a power saving state, the computer comprising:

a receiver configured to receive a first power saving command for shifting the external device to a first power saving state when a non-operation time reaches a first time;

a converter configured to convert the first power saving command into a second power saving command for shifting the external device to a second power saving state in which power consumption is lower than the first power saving state; and an output unit configured to output the second power saving command to the external device instead of the first power saving command.

12. The computer according to claim 1, wherein the second power saving command comprises a power off command.

13. The power saving method according to claim 7, wherein the second power saving command comprise a power off command.

14. The computer program according to claim 10, wherein the second power saving command comprises a power off command.

15. The computer according to claim 11, wherein the second power saving command comprises a power off command.

* * * * *

UNITED STATES PATENT AND TRADEMARK OFFICE
CERTIFICATE OF CORRECTION

PATENT NO. : 6,804,792 B2
DATED : October 12, 2004
INVENTOR(S) : Nishikawa

It is certified that error appears in the above-identified patent and that said Letters Patent is hereby corrected as shown below:

Column 10,
Line 24, change "the generate" to -- to generate --.
Line 28, change "the convert" to -- to convert --.
Line 33, change "configure" to -- configured --.

Column 12,
Line 29, change "command comprise" to -- command comprises --.

Signed and Sealed this

Twenty-eighth Day of December, 2004

JON W. DUDAS
*Director of the United States Patent and Trademark Office*